Patented Mar. 1, 1949

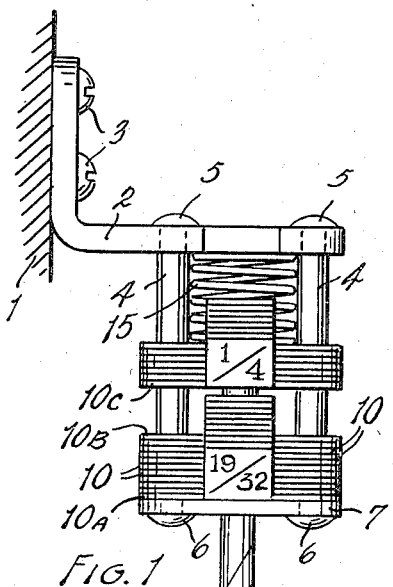
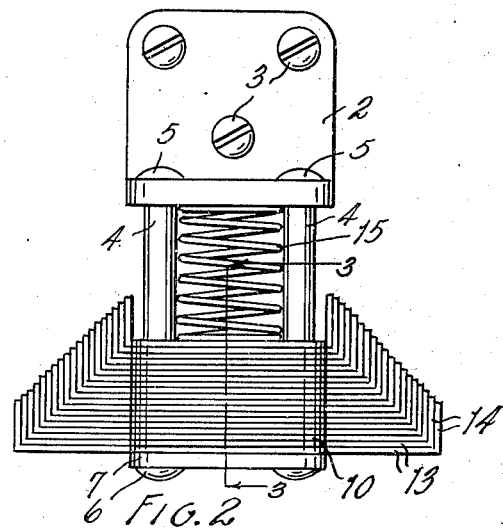
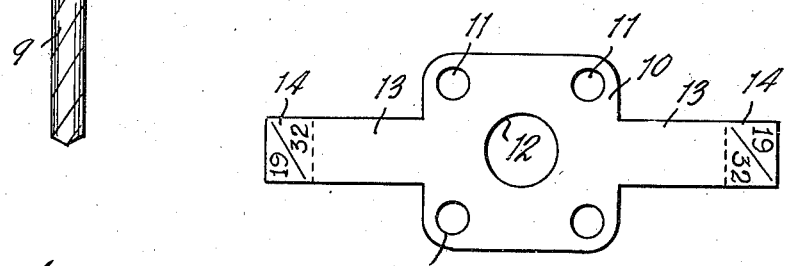
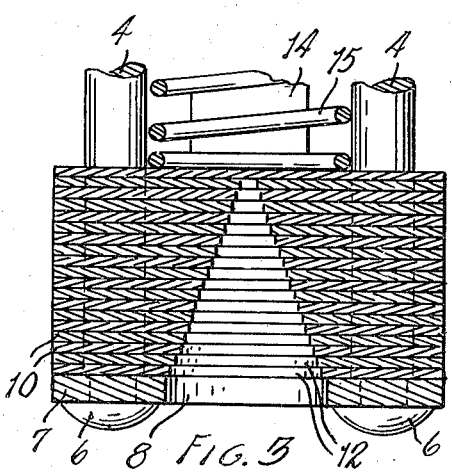
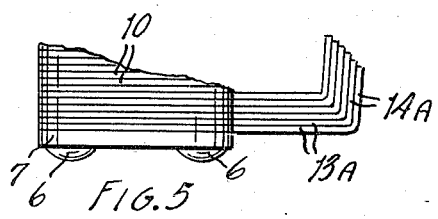

2,463,127

UNITED STATES PATENT OFFICE 2,463,127

GAUGING DEVICE

Robert R. Tallaksen, Winter, Wis., and William J. Stover, Grand Rapids, Mich.

Application April 22, 1947, Serial No. 743,020

9 Claims. (Cl. 33—178)

This invention relates to improvements in a gauging device.

The principal objects of this invention are:

First, to provide a device for rapidly and accurately measuring and indicating the diameter of cylindrical objects such as machine drills.

Second, to provide a gauging device for machine drills which is inexpensive to manufacture and which will rapidly and clearly indicate the size of a drill inserted in the device.

Third, to provide a gauging device that will show only one size indicium at a time making it impossible to misread the device by looking at an indicium adjacent the proper one.

Other objects and advantages pertaining to the details and economies of our invention will be apparent from the following description and claims.

The drawings, of which there is one sheet, illustrate a preferred form of our gauging device and one modified form thereof.

Fig. 1 is a front elevational view of our gauging device in operative position.

Fig. 2 is a side elevational view of our gauging device in non-indicating position.

Fig. 3 is a fragmentary cross sectional view along the line 3—3 in Fig. 2.

Fig. 4 is a plan view of one of the gauge plates shown in the other figures and in partially completed form.

Fig. 5 is a fragmentary side elevational view of a modified form of gauging device.

As set out in the objects, our gauging device is arranged to rapidly measure and indicate the diameter of slender cylindrical objects such as machine tool drills or short lengths of tubing. Our device is particularly useful where a large number of these objects are to be sorted and sized and our device is arranged to be conveniently attached to a suitable support such as a wall or a post indicated at 1 over a work bench where the sorting is to be carried out.

The gauging device includes an angle bracket 2, one arm of which is apertured to receive the screws 3 for attaching the gauge to the support, the other arm of which is provided with four downwardly extending guide posts 4 which are permanently secured to the arm by the riveted heads 5. The lower ends of the guide posts 4 are riveted as at 6 or otherwise permanently secured to a bottom plate 7 defining a central aperture or gauge hole 8, the size of which limits the size of the drill or tube which may be measured in our gauge. 9 indicates a machine drill having its shank pressed upwardly in the gauging device and as illustrated in the drawing, represents a ¼ inch drill.

Slidably mounted on the guide posts 4 are a plurality of gauge plates 10, each of which defines apertures 11 as indicated in Fig. 4 through which the guide posts extend. The gauge plates each define a central aperture 12, the size of the apertures in successive plates being successively graduated as indicated in Fig. 3, the graduations preferably corresponding to the standard sizes of machine drills or the various sizes of the objects to be measured. Each gauge plate is provided with a pair of arms 13 extending from the opposite sides thereof, the arms being of successively decreasing length as indicated in Fig. 3. The ends of the arms are turned upwardly in tabs 14 which are arranged to rest within the tabs of the next succeeding lower gauge plate. A coil spring 15 is positioned between the under side of the angle bracket and the top gauge plate to constantly urge the series of gauge plates downwardly into nesting relationship.

The tab on the bottom gauge plate 10A is marked as by stamping or etching with an indicium corresponding to the size of the hole 8 in the bottom plate 7. Each succeeding plate has its ears marked with an indicium corresponding to the size of the hole 12 in the next lower gauge plate. Thus as is illustrated in Fig. 1 the gauge plate 10B is provided with a ¼ inch central opening while the gauge plate 10C is provided with indicium as shown reading ¼. As the shank of the drill 9 is pressed upwardly through the holes 8 and 12, it will pass through the gauge hole in the plate 10B which is ¼ inch in diameter but will not pass through the gauge hole in the plate 10C since that gauge hole is smaller than ¼ inch in diameter. Therefore, the gauge plate 10C and all plates above it will be raised along the guide posts 4 on the end of the drill exposing the indicium ¼ on the tab of the gauge plate 10C. When the operator has thus determined the side of the drill 9, he will withdraw the drill and the spring 15 will return the raised gauge plates to their nested position.

In the modified form of gauge illustrated in Fig. 5, arms 13A are provided on one side only of the gauge plates 10 and the tabs 14A which are bent upwardly from the plane of the gauge plates as in the preferred form of gauge are sloped slightly outwardly from the vertical so that the tabs may be made to nest within the next lower tab without accurately filing or shaping a sharp corner between the tabs and the arms as is done in the preferred form of the invention.

It should be apparent that either form of the gauge is operable in a vertical, horizontal or inverted position and that the length of the arms 13 and nesting relationship of the tabs could be reversed so that the top gauge plate would have the longest arm 13 while the bottom gauge plate would have the shortest arm.

We have described two highly practical embodiments of our gauge and have not attempted to illustrate all possible modifications as it is felt that others may reproduce the essential features of the gauge with such modifications as are desired without further disclosure.

Having thus described our invention, what we claim as new and desire to secure by Letters Patent is:

1. A gauge comprising a series of gauging plates arranged in stacked relation for independent non-rotative sliding adjustment in the same plane and relative to adjacent plates of the stack whereby any one of the plates may be shifted relative to the other plates of the stack on one side thereof, the plates having aligned relatively graduated gauging openings therein, each plate having an indicium member turned from the plane of the plate and adapted to telescope within the indicium member of the adjacent lower plate of the stack, the indicium members being provided with indicia corresponding to the size of the gauging opening of the adjacent lower plate the dicia of all the indicium members except that of the bottom plate being concealed when the members are in nested position.

2. A gauge comprising a series of gauging plates arranged in stacked relation for independent non-rotative sliding adjustment in the same plane and relative to adjacent plates of the stack whereby one of the plates may be shifted relative to the lower plates of the stack, the plates having aligned relatively graduated gauging openings therein, each plate having an upturned indicium member adapted to telescope within the indicium member of the adjacent lower plate of the stack, the indicia members being provided with indicia corresponding to the size of the gauging opening of the adjacent lower plate the indicia of all the indicium members except that of the bottom plate being concealed when the members are in nested position.

3. A gauge comprising a support provided with depending spaced parallel posts, and a plurality of gauging plates slidably mounted on said posts in stacked relation, the plates having aligned graduated gauging openings therein, said plates having tab-like indicia members on one edge thereof adapted to nest within the indicium member of the adjacent lower plate, the indicia members with the exception of that of the bottom plate having indicia thereon corresponding to the size of the gauging opening of the next lower plate the indicia of all the indicium members except that of the other plate being concealed when the members are in nested position.

4. A gauge comprising a support provided with spaced parallel posts, and a plurality of gauging plates slidably mounted on said posts in stacked relation, the plates having aligned graduated gauging openings therein, said plates having tab-like indicia members on one edge thereof adapted to nest within the indicium member of an adjacent plate, the indicia members with the exception of that of the plate at one end of the stack having indicia thereon corresponding to the size of the gauging opening of the next adjacent plate the indicia of all the indicium members except that of the other plate being concealed when the members are in nested position.

5. A gauging device for slender cylindrical objects comprising an angular bracket having one arm adapted to be secured to a base, a plurality of guide posts secured to the other arm of said support in parallel relationship, a bottom plate secured to the free ends of said guide posts and defining a central aperture the size of which limits the size of object which may be measured, a plurality of gauge plates slidably mounted on said guide posts, said gauge plates defining a series of central apertures coaxial with said aperture in said bottom plate, said apertures in said gauge plates being of successively decreasing diameter from said bottom plate, arms extending from the sides of said gauge plates, tabs formed on the ends of said arms and turned from the planes of said gauge plates to rest in nesting relationship, and a coil spring positioned between the top gauge plate and the arm of said angle bracket, each of said tabs bearing indicium thereon corresponding to the size of the central opening in a next adjacent gauge plate, the lowest of said gauge plates bearing indicium corresponding to the size of the opening in said bottom plate the indicia of the tabs with the exception of that of the bottom plate being concealed when the plates are in their nested relationship, the indicia of a plate being exposed when it is shifted to non-nested position relative to the adjacent lower plate.

6. A gauging device for slender objects comprising a support adapted to be secured to a base, a plurality of guide posts secured to said support in parallel relationship, a bottom plate secured to the free ends of said guide posts and defining a central aperture the size of which determines the maximum size of object which may be measured, a series of gauge plates slidably mounted on said guide posts, said gauge plates defining a series of central apertures coaxial with said aperture in said bottom plate, said apertures in said gauge plates being of successively decreasing diameter from said bottom plate, arms extending from the sides of said gauge plates, said arms being of successively decreasing length from an end plate of said series, tabs formed on the ends of said arms and turned from the plane of said arms to rest in nesting relationship, and a spring positioned between an end gauge plate of the series and said support, each of said tabs bearing indicium thereon corresponding to the size of the central opening in an adjacent gauge plate except the gauge plate adjacent said bottom plate which bears indicium corresponding to the size of the opening in said bottom plate the indicia of the tabs with the exception of that of the bottom plate being concealed when the plates are in their nested relationship, the indicia of a plate being exposed when it is shifted to non-nested position relative to the adjacent lower plate.

7. A gauging device for slender objects comprising a support adapted to be secured to a base, a plurality of guide posts secured to said support in parallel relationship, a bottom plate secured to the free ends of said guide posts and defining a central aperture the size of which determines the maximum size of object which may be measured, a series of gauge plates slidably mounted on said guide posts, said gauge plates defining a series of central apertures coaxial with said aperture in said bottom plate, said apertures in said gauge plates being of successively decreasing diameter from said bottom plate, arms extending from the sides of said gauge plates, said arms being of successively decreasing length from an end plate of said series, tabs formed on the ends of said arms and turned from the plane of said arms to rest in nesting relationship, and a spring positioned between an end gauge plate of the series and said support, each of said tabs bearing indicium thereon corresponding to the size of the central opening in an adjacent gauge plate except an end plate of said series of plates the indicia of the tabs with the exception of that of the bottom plate being concealed when the plates are in their nested relationship, the indicia of a plate being exposed when it is shifted to non-nested position relative to the adjacent lower plate.

8. A gauging device for generally cylindrical objects comprising a support, a plurality of guide posts secured to said support in parallel relationship, a plurality of gauge plates slidably mounted on said guide posts, said gauge plates defining a series of coaxial central apertures, said apertures in said series of gauge plates being of successively decreased diameter, and tabs carried on said plates and turned from the planes of said plates to rest in nesting relationship, each of said tabs bearing indicium thereon corresponding to the size of the central opening in the next adjacent gauge plate except on the gauge plate at one end of said series of plates the indicia of the tabs with the exception of that of the bottom plate being concealed when the plates are in their nested relationship, the indicia of a plate being exposed when it is shifted to non-nested position relative to the adjacent lower plate.

9. A gauging device for generally cylindrical objects comprising a support, a plurality of guide posts secured to said support in parallel relationship, a plurality of gauge plates slidably mounted on said guide posts, said gauge plates defining a series of coaxial central apertures, said apertures in said series of gauge plates being of successively decreased diameter, and indicia surfaces on said plates arranged to lie in over-lapping stacked relationship, said indicia surfaces each bearing indicium corresponding to the size of opening in an adjacent gauge plate except an end plate of said series of plates the indicia of the tabs with the exception of that of the bottom plate being concealed when the plates are in their nested relationship, the indicia of a plate being exposed when it is shifted to non-nested position relative to the adjacent lower plate.

ROBERT R. TALLAKSEN.
WILLIAM J. STOVER.

REFERENCES CITED

The following references are of record in the file of this patent:

UNITED STATES PATENTS

| Number | Name | Date |
|---|---|---|
| 524,589 | Gruebel | Aug. 14, 1894 |
| 741,146 | Labofish | Oct. 13, 1903 |
| 926,688 | Carroll | June 29, 1909 |
| 1,389,486 | Brewer | Aug. 30, 1921 |
| 1,755,152 | Parker | Apr. 15, 1930 |

FOREIGN PATENTS

| Number | Country | Date |
|---|---|---|
| 721 | Great Britain | Jan. 16, 1915 |